(12) United States Patent  (10) Patent No.: US 7,985,922 B2
Maganas  (45) Date of Patent: Jul. 26, 2011

(54) APPARATUS AND METHODS FOR BOOSTING ELECTRICAL POWER

(75) Inventor: Thomas C. Maganas, Manhattan Beach, CA (US)

(73) Assignee: Thomas C. Maganas, Manhattan Beach, CA (US)

( * ) Notice: Subject to any disclaimer, the term of this patent is extended or adjusted under 35 U.S.C. 154(b) by 0 days.

(21) Appl. No.: 12/778,836

(22) Filed: May 12, 2010

(65) Prior Publication Data
US 2010/0219805 A1  Sep. 2, 2010

Related U.S. Application Data

(63) Continuation-in-part of application No. 12/396,609, filed on Mar. 3, 2009, now abandoned, which is a continuation-in-part of application No. 12/337,862, filed on Dec. 18, 2008, now Pat. No. 7,759,579.

(51) Int. Cl.
H01B 11/06 (2006.01)
(52) U.S. Cl. ........................................................ 174/36
(58) Field of Classification Search .................. 174/36, 174/110 R, 113 R, 120 R; 29/825, 826
See application file for complete search history.

(56) References Cited

U.S. PATENT DOCUMENTS

| | | | |
|---|---|---|---|
| 4,515,847 A * | 5/1985 | Taverna et al. ................. | 428/107 |
| 4,559,973 A | 12/1985 | Hane et al. | |
| 4,866,212 A | 9/1989 | Ingram | |
| 5,143,745 A | 9/1992 | Maganas et al. | |
| 5,486,096 A * | 1/1996 | Hertel et al. .................. | 416/224 |
| 5,676,070 A | 10/1997 | Maganas et al. | |
| 5,928,618 A | 7/1999 | Maganas et al. | |
| 6,235,247 B1 | 5/2001 | Maganas et al. | |
| 6,264,908 B1 | 7/2001 | Maganas et al. | |
| 6,457,552 B2 | 10/2002 | Maganas et al. | |
| 6,520,287 B2 | 2/2003 | Maganas et al. | |
| 6,962,681 B2 | 11/2005 | Maganas et al. | |
| 7,220,468 B2 | 5/2007 | Ogawa et al. | |
| 7,220,482 B2 | 5/2007 | Mino et al. | |
| 7,459,635 B2 | 12/2008 | Belli et al. | |
| 7,509,798 B2 | 3/2009 | Maganas | |

(Continued)

FOREIGN PATENT DOCUMENTS

JP  2002-537481  11/2002

OTHER PUBLICATIONS

U.S. Appl. No. 12/337,862, filed Dec. 18, 2008, Maganas.

(Continued)

Primary Examiner — William H Mayo, III
(74) Attorney, Agent, or Firm — Workman Nydegger

(57) ABSTRACT

An electrical power boosting apparatus includes a metal substrate having a monomolecular carbon-based film on first and second surfaces, a conductive core, a positive electrode at one end, and a negative electrode an opposite end and magnets positioned adjacent and in a spaced-apart relationship to the metal substrate, the magnets are oriented so that north and south poles of each magnet are matched with opposite poles of an adjacent magnet. Electrical power is boosted by passing an initial electric current having an initial voltage through the conductive core of the metal substrate and causing or allowing an interaction between the metal substrate, the monomolecular carbon-based film, and the magnets to produce a modified electric current having a final voltage that is greater than the initial voltage.

20 Claims, 12 Drawing Sheets

U.S. PATENT DOCUMENTS

| | | |
|---|---|---|
| 7,759,579 B2 | 7/2010 | Maganas |
| 2006/0269740 A1 | 11/2006 | Udy |
| 2010/0155524 A1 | 6/2010 | Maganas |
| 2010/0155527 A1 | 6/2010 | Maganas |

OTHER PUBLICATIONS

Search Report dated Aug. 9, 2010 cited in PCT/US2009/068566.
Search Report dated Aug. 3, 2010 cited in PCT/US2009/068574.
U.S. Appl. No. 12/396,609, filed Feb. 19, 2010 Office Action.
U.S. Appl. No. 12/396,609, filed Mar. 25, 2010 Notice of Allowance.
Notice of Allowance dated Feb. 5, 2010 cited in U.S. Appl. No. 12/337,862.

\* cited by examiner

APPARATUS AND METHODS FOR BOOSTING ELECTRICAL POWER

CROSS REFERENCE TO RELATED APPLICATION

This application is a continuation-in-part of U.S. application Ser. No. 12/396,609, filed Mar. 3, 2009, which is a continuation-in-part of U.S. application Ser. No. 12/337,862, filed Dec. 18, 2008 (now abandoned), the disclosures of which are incorporated herein in their entirety.

BACKGROUND OF THE INVENTION

1. The Field of the Invention

The present invention relates to a monomolecular carbon-based film and an electrical shield incorporating such film for enhancing power transmission across a conductive material.

2. The Related Technology

Electrical power lines are used to transmit electricity from power plants to grid substations, then to homes, factories and other end users and are found all over the world. Power lines are transmission cables made up of electrically conductive wires. Because current typically flows over transmission cables that are without insulation, a major problem is corona discharge, which is composed of an electromagnetic field of electrons. When a corona is fully crested the dam of electrons cracks, resulting in a loss of voltage and release of electrons to the atmosphere. To compensate for voltage and current losses, power must be regenerated and/or boosted about every fifty miles between grid substations to recharge current. It has been estimated that up to 60% of the average power plant production of energy is lost to corona discharge, as reported in Washington D.C. by a Dr. Clayton Teague, Director National Nanotechnology Coordination and Office of Nano scale Science, Engineering, and Technology.

In view of the foregoing, there is a long-felt but unsatisfied need to provide a more efficient method of transporting electrical power over power transmission lines.

BRIEF SUMMARY

The invention relates to a monomolecular carbon-based film, and its use to enhance currant flow over an electrical power line. Power lines transmit current over cables that are generally open to the atmosphere and there is no reliable way, including the use rubber, to effectively shield a power transmission cable. According to the invention, power transmission is enhanced using by enclosing a power transmission cable within a shield coated with a unique film comprised of elongated, nano-scale carbon-based molecules aligned on a surface of a shield. The elongated carbon molecules are aligned side-by-side to form the monomolecular film, which has no film breaks, cracks or other discontinuities and cannot be penetrated by electrons. Positioning the shield so as to insulate an electrical power line prevents corona discharge of electrons and enhances (or boosts) power transmission.

The invention also relates to a process for forming and depositing the monomolecular carbon-based film on a shield or intermediate product used to form a shield, a process for positioning the shield or intermediate product around a power line, and a process for achieving enhanced (or boosted) power transmission. The film encloses the cable and stops penetration by electrons, which reduces corona discharge.

The invention also relates to apparatus that combine the electrical shield properties of the monomolecular carbon-based film and a magnetic field provided by magnets in order to further enhance, or boost, power transmission over a power line or other electrically conductive material. Research and testing suggest that a power generating device can be provided for increasing the voltage across a conductive metal substrate encased within the aforementioned and/or coated with the monomolecular carbon-based film and placed within a magnetic field provided by magnets positioned around the metal substrate. The monomolecular carbon-based film on or around the conductive metal substrate forms a shield that completely encapsulates the electrons and keeps them from penetrating through the film. Magnets (e.g., U-shaped magnets) are placed outside and around the conductive metal substrate in order to reflect electrons back to the metal substrate, which can form a corona between the shield and magnets with a continuous rotation of the electrons between the shield and magnets. The result, which is surprising and unexpected, is an increase in output voltage that is greater than the input voltage, suggesting that a generator (or battery) resulted from the invention relating to enhancing power transmission over power transmission lines through the use of the shield in combination with magnets.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

Figure 1:
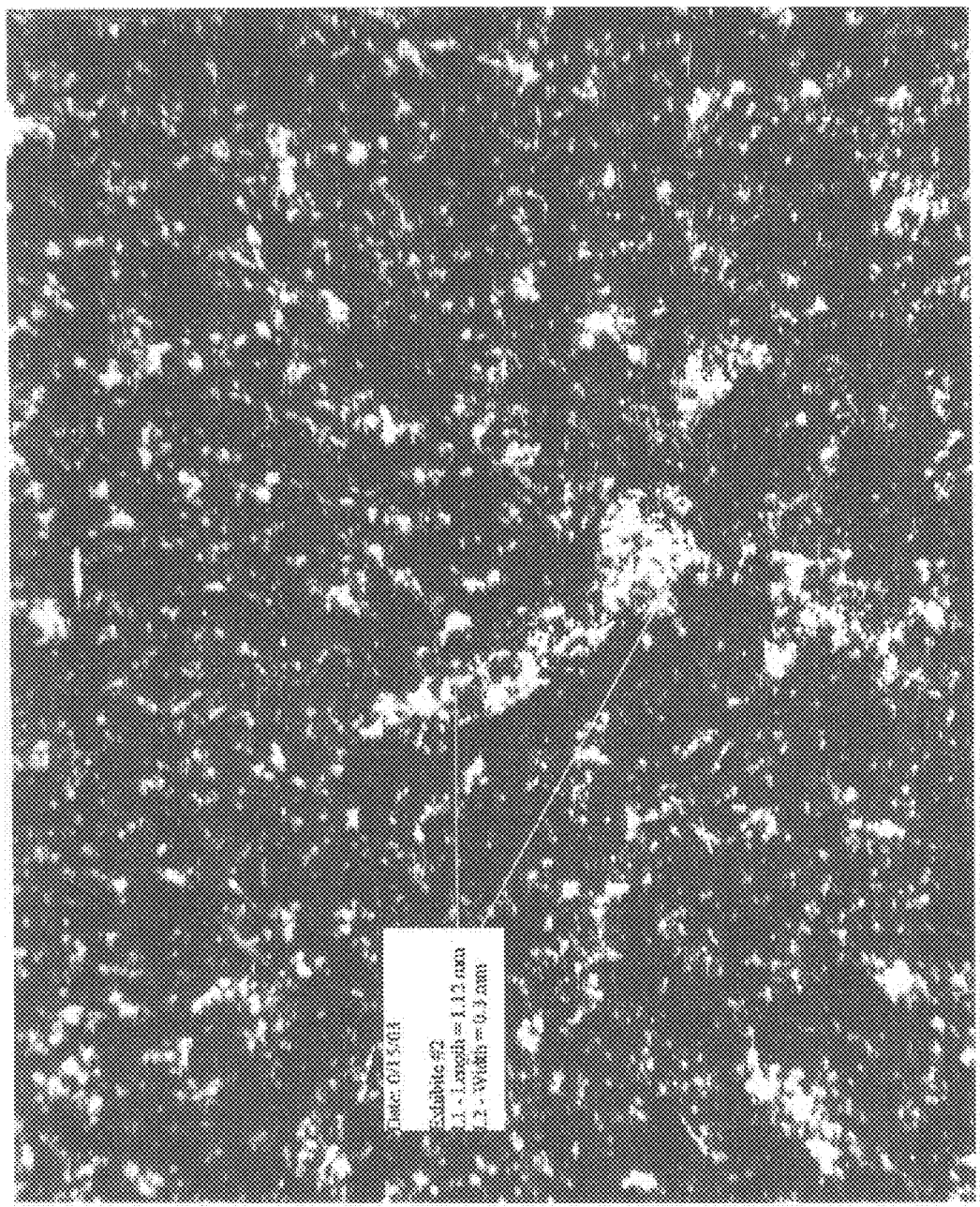
FIG. 1 is a photograph of a monomolecular film magnified 25 times using a 100 mm lens.

The invention relates to a monomolecular carbon-based film used to shield and enhance transmission of electrical power over an electrical power line. The invention also relates to methods for forming and depositing the monomolecular carbon-based film on an electron impenetrable shield or intermediate product used to form an electron impenetrable shield and also positing the an electron impenetrable shield or intermediate product around a power line to yield a shielded power line. The shield insulates the power over woven lines that form the power cable and prevents corona discharge of electrons outside of the power line, thereby enhancing efficiency of current transmission. Magnets can be positioned within the tubular shield every 20-50 miles to increase or accelerate current flow through the shield in order to further enhance (or boost) power transmission over the power line. The shield insulates and prevents loss of voltage from the power line and prevents corona discharge of electrons outside of the power line, and the magnetic field provided by the magnets enhances or boosts voltage.

This same phenomenon permits for an increase in voltage through a conductive metal substrate treated with the monomolecular carbon-based film and surrounded by magnets. The film encapsulates and shields electrons within the substrate and keeps them from penetrating through the film. Magnets placed around the substrate enhance movement of electrons passing through the conductive substrate so as to produce an output voltage that is greater than the input voltage. In the context of a tubular shield, magnets can narrow the flow of electrons to increase their flow.

As used herein, the term "monomolecular carbon-based film" refers to film that is made by aligning elongated nano-scale, carbon-based molecules that form a film that is a single molecule thick. The film is dense, strong, durable, continuous, indelible, and chemically resistant. The elongated nano-scale carbon-based molecules are aligned shoulder-to-shoulder, are essentially parallel to each other, and lock onto any substrate surface. Silicon nitride particles produced as a byproduct form a dome cap over the elongated carbon-based molecules, which can be removed to leave just the monomolecular carbon-based film on the substrate.

As shown in FIGS. 1-4, which are a series of photographs at various levels of magnification, elongated carbon-based molecules that make up the monomolecular film are tubular with a dome cap top and are 30 angstroms wide by 50 angstroms long. When compressed, the molecule height is increased to 70 angstroms without cracking the molecule, and when compression is released returns to 50 angstroms. Individual molecules have a high affinity for each other and are believed to be electromagnetically charged with negative and positive ends when aligned in an orderly fashion to form the monomolecular film, and they form an unbreakable bond that creates a durable, continuous, indelible, chemically resistant surface film or deposit (see FIG. 5).

Figure 4:
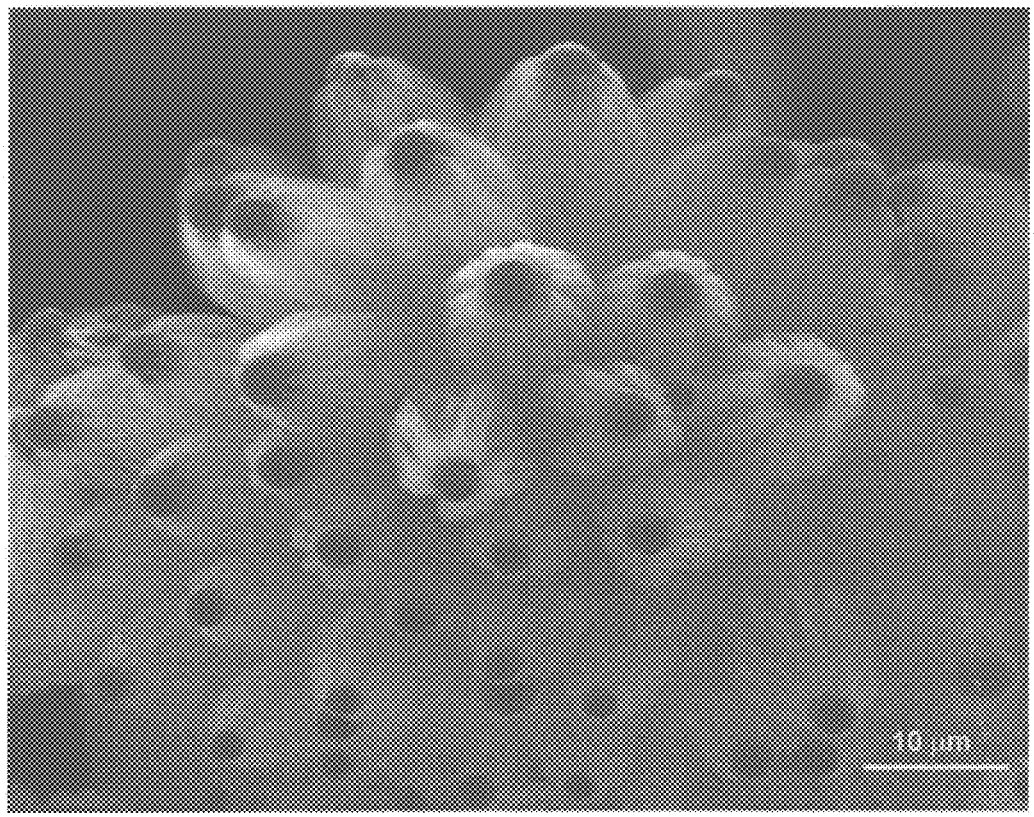
FIG. 4 is a nano-scale photograph that shows a portion of the tubular material shown in FIGS. 3A-3C at higher magnification.
Figure 5:
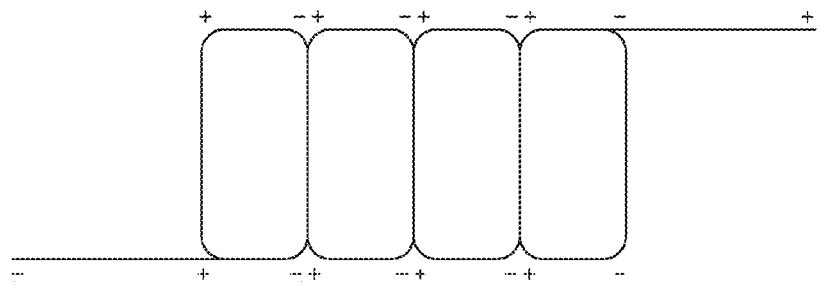
FIG. 5 schematically illustrates a proposed arrangement of carbon molecules in which oppositely charged sides are aligned adjacent to each other.

The outer or exposed surface of the elongated carbon-based, nano-scale molecules is a product derivative of silicon or silicon nitride particles that form into tubular shapes, and which produce (or chemically grow) the elongated carbon-based nano-scale molecules. This has been verified using a new and extremely powerful electron microscope that produced a photograph released by Johannes Gutenberg University in Mainz Germany (FIG. 4). Excess silicon or silicon nitride particles (which are generally appear as pods or fig leaves) can be removed through surface treatment (i.e., stripping with hydrofluoric acid with no damage to the carbon-based molecules deposited beneath the silicon) or they can be ignored or removed with friction. The elongated carbon-based, nano-scale molecules are tubular with a dome top. The existence of the monomolecular carbon-based film can be detected using a volt meter and, in addition, is evidenced by the altered properties of substrates treated therewith (e.g., shielding a power line prevents corona discharge; electrons cannot penetrate the shield, substrate has reduced friction, reduced temperatures, etc.).

FIG. 1 shows a magnified photograph of a monomolecular carbon-based film produced using a diesel engine coupled with a reactor having a bed of silica particles. Methods for manufacturing the film are discussed below in greater detail. The material comprising the film in the photograph of FIG. 1 is shown further magnified in FIG. 2A. FIG. 2B is a magnified photograph of a similar material produced as claimed by NEC of Japan (and produced by Johannes Gutenberg University). The similarities between the materials shown in FIGS. 2A and 2B are readily apparent, particularly when viewing higher resolution originals rather than reproduced copies, with the magnified photograph of FIG. 2B providing independent verification of the existence and nature of the material shown in FIG. 2A.

Figure 2A:
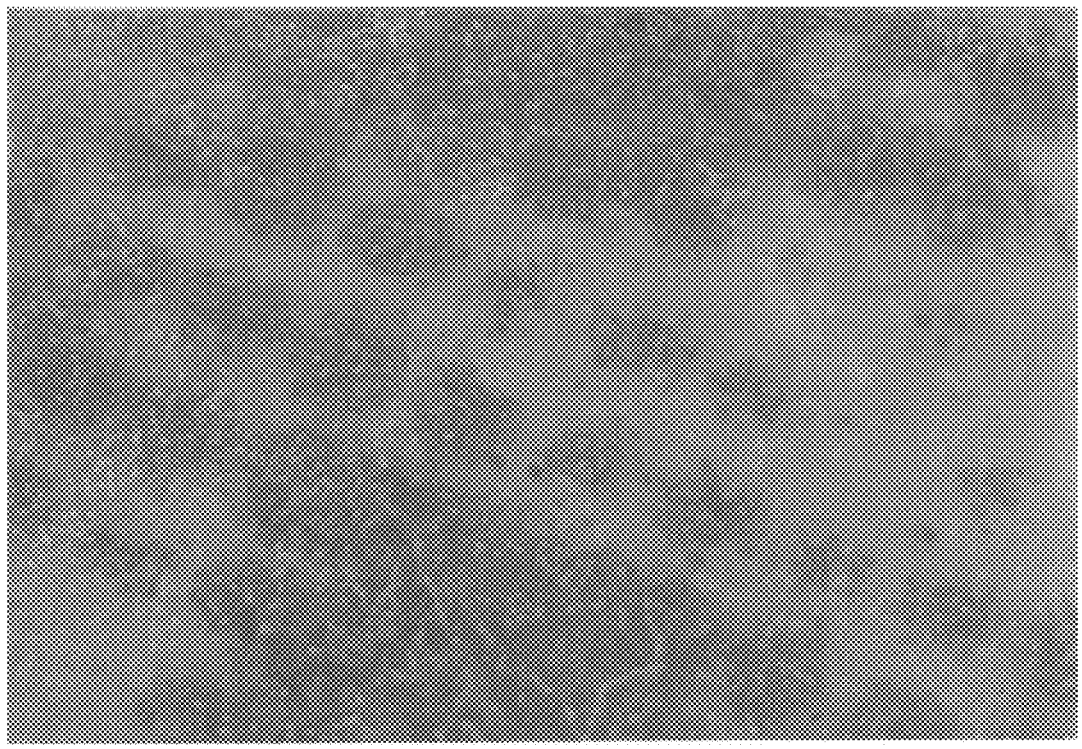
FIG. 2A is a three dimensional photograph of the film shown in FIG. 1 magnified 10 times to show a closer view of the film structure.
Figure 2B:
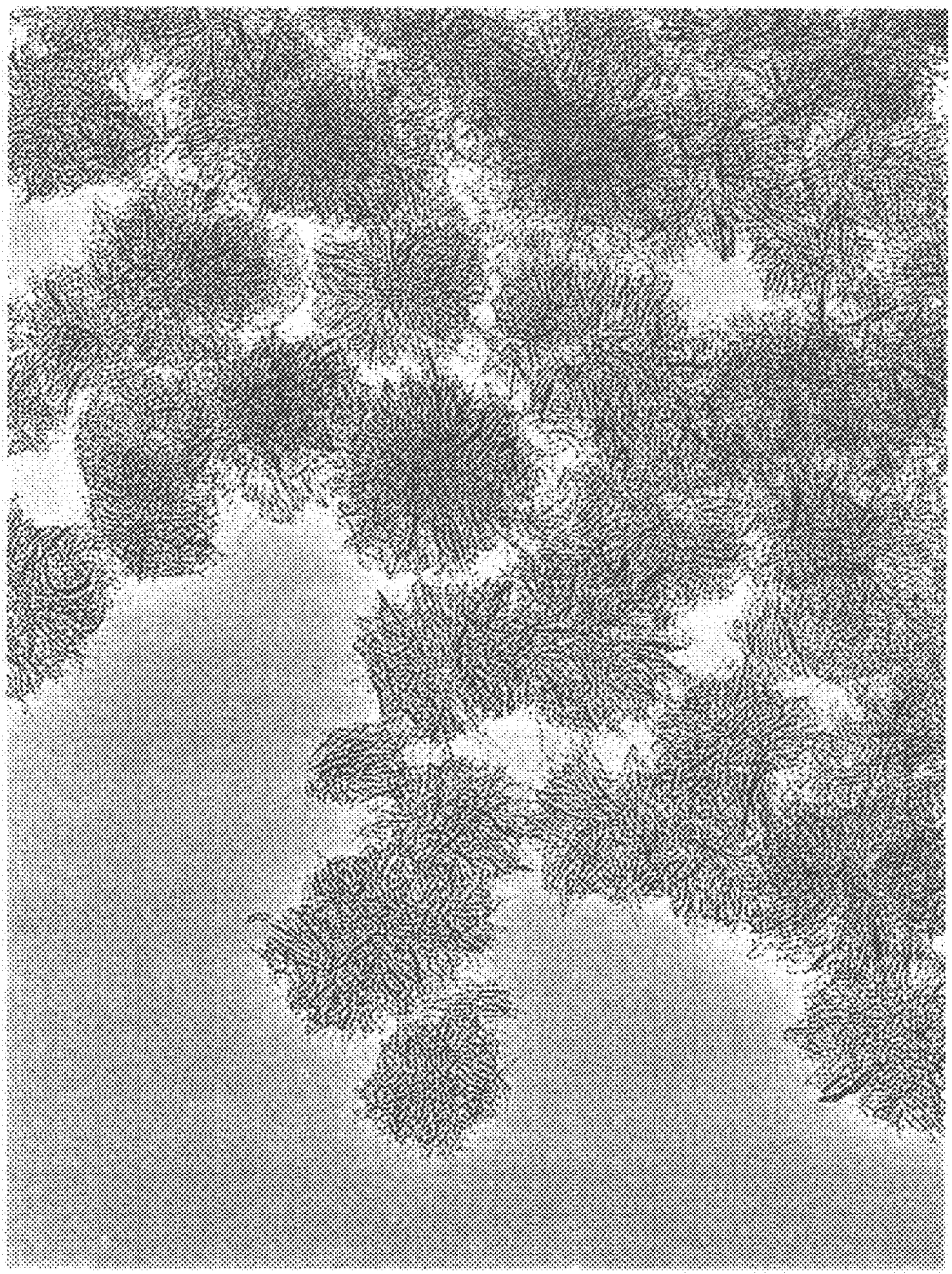
FIG. 2B is a photograph that shows a material similar to and verifies the structure of the material shown in FIG. 2A.
Figure 3A:
FIG. 3A is a photograph of the material shown in FIG. 2A but magnified 10 times to show that the film is comprised of elongated tubes.
Figure 3B:
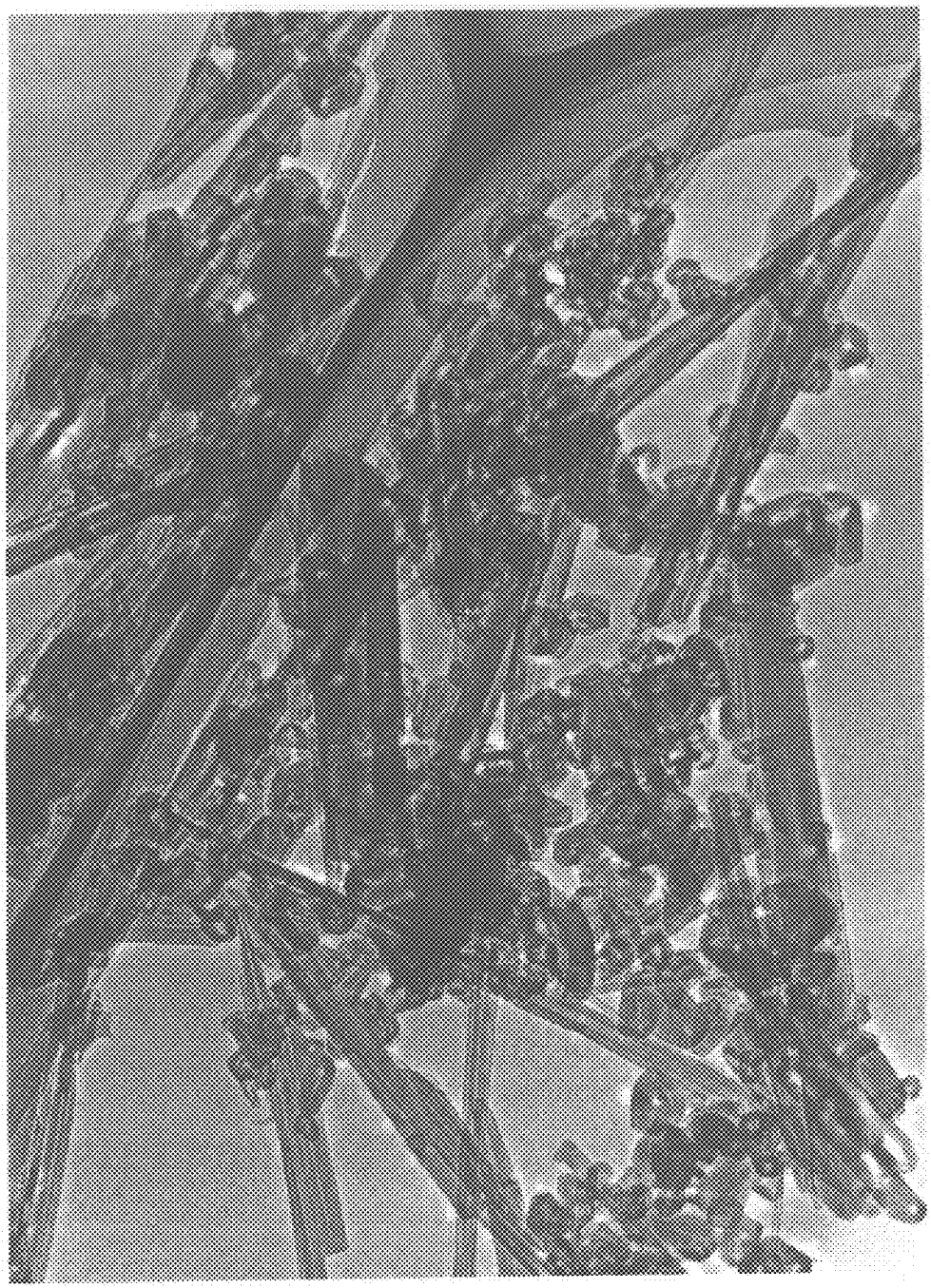
FIG. 3B is a photograph that shows a material similar to and verifies the elongated tubular nature of the material shown in FIG. 3A.
Figure 3C:
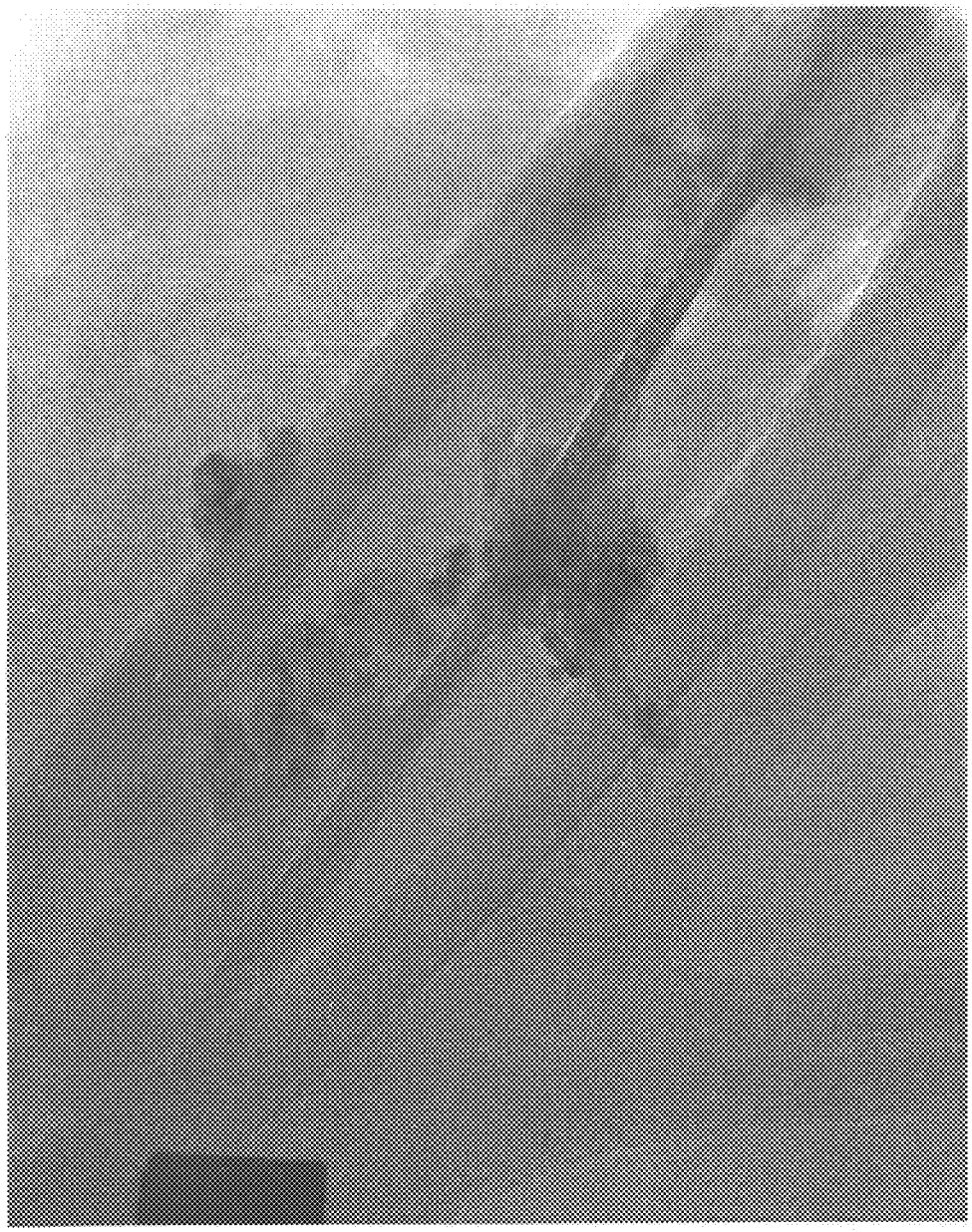
FIG. 3C is a photograph of the tubular material of FIGS. 3A and 3B at higher magnification.

The material shown in FIG. 2A was further magnified in the photograph shown in FIG. 3A, which better indicates the elongated nature of the carbon-based nano-scale particles within the monomolecular carbon-based film of FIGS. 1 and 2A. FIG. 3B is a magnified photograph of a similar elongated monomolecular material produced by Johannes Gutenberg University in Mainz, Germany. The similarities between the materials shown in FIGS. 3A and 3B are readily apparent, particularly when viewing higher resolution originals rather than reproduced copies, with the magnified photograph of FIG. 3B providing independent verification of the existence and nature of the material shown in FIG. 3A. FIG. 3C is a further magnification of a material similar to those shown in FIGS. 3A and 3B.

FIG. 4 is a nano-scale photograph taken by a high power electron microscope at Johannes Gutenberg University, which shows elongated carbon-based nano-scale molecules. The molecules include a dome top that is apparently made of carbon and also a material believed to be silicon-based particles that, when seen through a standard electron microscope, appear as tubular and extending around the elongated carbon-based, nano-scale molecules and that leave a mark of the break.

The elongated carbon-based, nano-scale molecules that make up the monomolecular carbon-based film withstood 40 gigapascals or 400,000 atmospheres of pressure before cracking. Further testing of the dome top molecule showed that its interior withstood 350 gigapascals of electron pressure before cracking. These reports are now recognized by other German universities, as well as the university of Finland and Cornell University in the USA. The monomolecular film also led to other uses, including the invention of a new "battery" (or power boosting apparatus) formed by producing a continuous electron corona in a magnetic field by bombarding both sides of a metal plate with electrons, producing circles of magnetically controlled current energy that produces a continuous currant. The monomolecular film deposited to metal rejects electron penetration to produce a continuous flow of current without the need to recharge the "battery" (or power boosting apparatus). The monomolecular film, though almost invisible, is easily seen with reflection of light, and electron rejection that can be validated with a common volt meter.

The discovery of elongated carbon-based molecules that when aligned form a monomolecular film was originally discovered and developed in 1987 by Tom Maganas and Al Harrington. Al Harrington identified and described precisely the size and shape of the elongated molecule, which was measured with an ellipsometer to be 30 angstroms by 50 angstroms. When compressed, the molecule increased in height to 70 angstroms without the normal cracking found in all other known molecules (as now validated by Johannes Gutenberg University and that was described as a hollow tube with a dome top). When compressed the elongated molecules did not crack as do all other known molecules crack as do soap bubbles under any pressure. This was so reported in U.S. Pat. No. 5,143,745 to Maganas and Harrington. U.S. Pat. No. 6,264,908 to Maganas and Harrington, incorporated by reference, describes a process for forming silicon nitride particles and that was later found to also produce an elongated carbon tube (through chemistry which is not fully understood). The carbon-based elongated molecules separate or drop from the silicon nitrite particles, which produce two separate layers. The top layer is broken debris made up as silicon nitride particles that appear as tubes of various sizes when seen with a standard electron microscope and microscopically seen as incomplete film, or with complete pods that resemble fig leaves, and which is debris of little or no value.

Many experts in the field of nano materials have mistaken such silicon tubes as carbon based or graphite based tubes. The base layer is made up of elongated carbon-based molecules that, when aligned, form an uncontaminated monomolecular film beneath the silicon nitrite pods (i.e., that appear as fig leaf shaped debris).

A similar or duplicate reaction was discovered in CVD, or Chemical Vapor Deposition, and lead to a second method of production of fullerenes and a third method that produced the same silicon nitrite particles and that produce the elongated carbon molecules from a diesel engine that catalytically produces Complete Combustion™. A fourth method used by Johannes Gutenberg University is performed by collecting the elongated molecules used in their tests, which includes today's standard method of arcing carbon rods. This method is the most inefficient way to collect such materials.

In contrast, the disclosed method is the most efficient way to produce the elongated carbon-based, nano-scale molecules that can be aligned to form a monomolecular film and uses a reactor that produces hydroxyl radicals that cause reactions in diesel engine compression, and that forms supercritical water as a gas that dissolves 18 non organic elements from injected fuel, including sulfur which is dissolved or refined to a trace of sulfate ash, (with a two thirds reduction of fuel under 80,000 lbs load tested by both EPA-DOT and CARB certified test agencies that performed both CFR 40-41 tests with and a great reduction of cost of diesel fuel) and prior to Complete Combustion™. At that point muons are produced as a byproduct of supercritical water at the point of Complete Combustion™ that absorb oxygen and dissolve unburned elements as fuel.

The muon is basically a heavy electron that has an electrical charge identical to that of an electron. Andrei Sakharov and F. C. Frank predicted the phenomenon of muon-catalyzed reactions on theoretical grounds before 1950, and Y. B. Zel'dovitch wrote about the phenomenon of muon-catalyzed reactions in 1954. Each catalyzing muon has a life span of about 2.2 microseconds, as measured in its rest frame, and the entire cycle is dedicated to locating suitable isotopes with which to bind. The muon cycle is the critical step that lowers the normal exhaust average temperature from 707° F. exhaust is reduced to 49° C. output and Complete Combustion™ according to the Maganas Process. All standard diesel engines have incomplete combustion, producing soot, sulfur, and twenty three other methane and non methane hydrocarbon contaminants that are continually dumped into the atmosphere with huge test data variations described in CFR 40-86.34 that legally requires 10% weighted averages. Whereas diesel engines equipped with Maganas catalytic converter produce data variations of 0.02% with Complete Combustion™ emission output at exhaust valve chamber is 99.995% oxygen, nitrogen, and a 80% depleted carbon dioxide, and proven by both 13 and 8 mode EPA mandated tests provided by EPA-DOT certified CFR 40-41 diesel with test data variations within 0.02%. The balance of the 0.005% includes a very small amount of the material that forms the unique elongated carbon-based molecules.

Recently Johannes Gutenberg University in Mainz, Germany bombarded with electrons the elongated carbon-based molecule, which was first discovered, described, and precisely measured and that matched size and shape by both Al Harrington and Tom Maganas. The information was published by Rensselaer Polytechnic Institute, which verified the existence of the elongated molecule that was collected by the arcing of carbon rods, which is a common and expensive method of collecting nano particles, which forms huge amounts of dust and debris, and are used in nano composites today. All four methods have a common chemistry (which reaction is not fully understood), is now easily seen with a new more powerful German electron microscope that produced a photograph of the elongated molecule and included a scale to measure precisely the shape and size of the carbon molecule that confirms Al Harrington, and Maganas 1987 claims. The most important part of the photo confirms that the elongated molecules are a derivative of silicon nitride particles and elongated carbon molecules as a growth of silicon nitrite particles that, when seen with a standard electron microscope, appear as various sized tubes gathered as floating grape leaves, and photographically matched all four methods and confirmed Maganas' and Harrington's previous photos from CVD of fullerenes and now Johannes Gutenberg University photos. Rensselaer recently published the electron microscopic photo of the elongated molecules, which were produced by arcing carbon rods. They were aligned with nano wire then bombarded with electrons at a single dwarfed nano carbon molecule that cracked when electron pressures reached 40 gigapascals, or (400,000) atmospheres of pressure. The recent report from Gutenberg University in Mainz, Germany, was reported and certified by Rensselaer Polytechnic Institute, and was recognized by many other German universities, as well as The University of Finland and Cornell University in the USA. An electron microscopic photo was later released by Gutenberg University of our unique elongated molecule fully sized attached to silicon particles, which was described in U.S. Pat. No. 6,264,908 referred to above.

The unique elongated molecules are resistant to electrical and mechanical friction. They eliminate the problem of corona discharge from electrical transmission lines by enclosing the cable with a structure (e.g., a tube, wrap or other enclosure) that can support monomolecular film deposited structure would produce three functions: (1) reducing friction, (2) eliminating corona discharge, and (3) inhibiting weathering of the structure. The unique elongated carbon-based molecules that, when aligned, form a monomolecular film that are useful in solving other major problems, which include problems in aircraft, such as aluminum scratches, problems with aircraft lift, and that would replace a ceramic coating produced in Italy.

Figure 6:
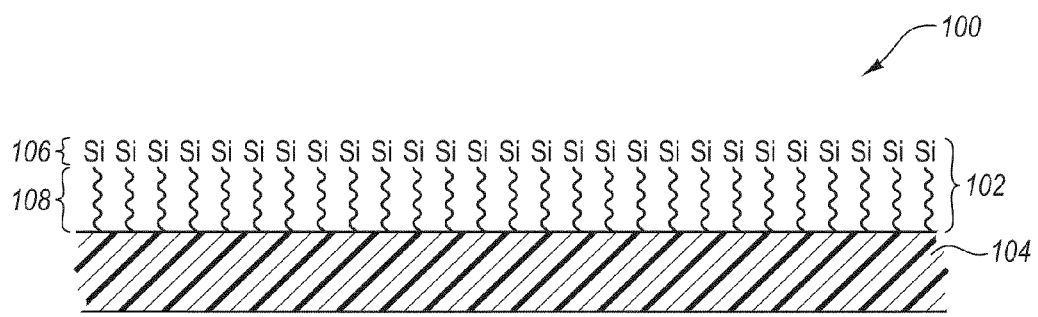
FIG. 6 is a cross-sectional schematic view of a substrate with elongated, nano-scale carbon-based molecules that when aligned form a monomolecular carbon-based film on a surface thereof.

FIG. 6 schematically illustrates a treated metal article 100 that includes a monomolecular carbon-based film 102 deposited on a surface of a metal substrate 104. The monomolecular carbon-based film 102 is comprised initially of an outer layer 106 of silicon or silicon nitride and an inner layer 108 of a carbonaceous (e.g., graphitic) strand (e.g., a carbon nanotube or other ordered graphitic carbon material). The inner layer 108 includes individual molecules which are arranged generally parallel to each other and perpendicular to the surface of the substrate 104. The metal substrate may comprise any desired metal that can be formed into a desired shape of a shield (e.g., iron, steel, copper, aluminum, and the like). The outer layer 106 of silicon or silicon nitride can be removed or left in place as desired.

The monomolecular carbon-based film 102 is remarkably smooth, resistant to chemical attack, and, in combination with the metal substrate 104, provides a shield that prevents penetration of electrons. This permits more efficient transmission of electrical power through a power line shielded by a metal tube or other structure that includes the monomolecular carbon-based film.

Figure 7:
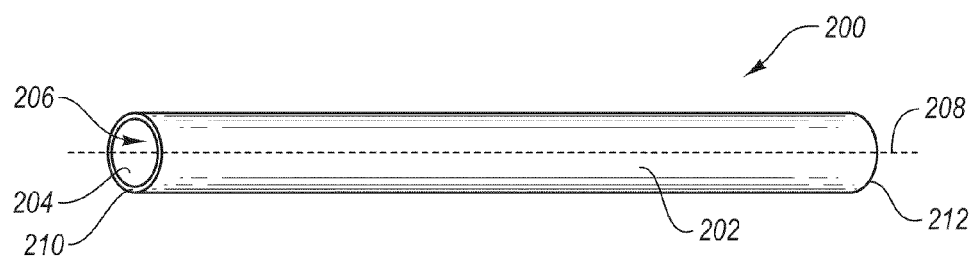
FIG. 7 is a perspective view that illustrates a monomolecular carbon-based film comprised of aligned carbon-based molecules deposited on a surface of a tubular electrical power cable shield.

FIG. 7 illustrates an electrical cable shield or tube 200 that includes an outer surface 202, an inner surface 204, and a hollow interior 206 into which an electrical power line or other wire can be inserted. The inner surface 204 includes the monomolecular carbon-based film in order to insulate, shield and prevent passage of electrons, such as via corona discharge. The outer surface 202 may also include the monomolecular carbon-based film in order to guard against corrosion and provide long-term stability of the shield when exposed to the elements. The tube 200 extends along a longitudinal axis 208 between a first end 210 and a second end 212. The film may be deposited in every part of the tube. The tube 200 may be a solid pipe or a flexible tape treated with the monomolecular film that is wrapped around a power line.

Figure 8:
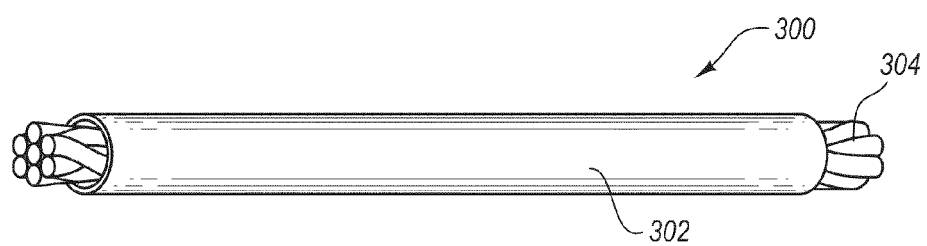
FIG. 8 is a perspective view that illustrates an electrical power cable encased within and electrically shielded by an electrical power cable shield covered on both the inside and outside surface with a monomolecular carbon-based film.

FIG. 8 illustrates an exemplary shielded power line 300, which is comprised of an electrical cable shield 302 encased around a power line 304. Depending on the length of the power line 304, the shield 302 may include multiple tubes 302 placed end to end. The shielded power line 300 may be placed into commission as shown, or it may be formed by retrofitting an existing power line 304 with one or more shields 302. The shielded power line 300 provides enhanced transmission of electrical power compared to an unshielded power line.

Figure 9:
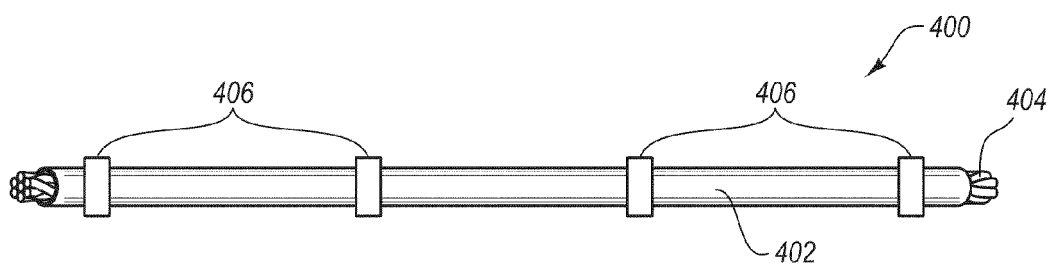
FIG. 9 is a perspective view that illustrates an electrical power cable encased within and electrically shielded within an electrical power cable shield and having magnets spaced-apart (e.g., by about 50-100 miles)

FIG. 9 illustrates an exemplary shielded electrical power line 400, which includes one or more monomolecular carbon-base film treated tubes 402 positioned around a power line 404. In order to further enhance (or boost) power transmission through the power line 400, a plurality of magnets 406 are positioned at intervals along the shielded electrical power line 400, either inside or outside the tubes 402 as shown. The magnets 406 help to further prevent leakage of power along the power line 400. According to one embodiment, the magnets 406 may be designed to join and seal interfaces between individual tube segments 402. The magnets 406 may be spaced apart as desired, e.g., by a distance of approximately 20 feet, or within a range of about 1-50 feet, or about 5-40 feet, or about 10-30 feet. Alternatively, or in addition, large mega-sized magnets may be spaced apart by larger distances (e.g., about 100 miles, or about 1-200 miles, or about 20-180 miles, or about 50-150 miles).

The elongated carbon-based, nano-scale molecules that are aligned to form a monomolecular carbon-based film can be formed on any surface as a byproduct of nano technology that led to a diesel Catalytic Converter™ that produced "Complete Combustion™". This system includes a bed of silica and/or alumina particles that produce hydroxyl radicals, which are attracted to piston compression heat of 307° C., produce the hydroxyl radicals and subsequently supercritical water as a gas, and interact with injected diesel fuel to refine 18 known organic elements and reduce sulfur to a trace of sulfate ash. They subsequently produce muon methyl radicals. The bed interacts with gases from the diesel engine for 20 seconds upon ignition to generate highly reactive hydroxyl radicals that are believed to provide several benefits. The interaction between the bed of silica and/or alumina particles and gases from the diesel engine yields a modified gas stream that consists 99.995% of nitrogen, oxygen, and 80% depleted carbon dioxide, and a small but significant quantity of a byproduct that yields the monomolecular carbon-based film, which can be deposited on any substrate. If the substrate is an elongate sleeve, depositing the monomolecular carbon-based film on a surface thereof yields an electrical cable shield according to one embodiment of the disclosure.

Figure 10:
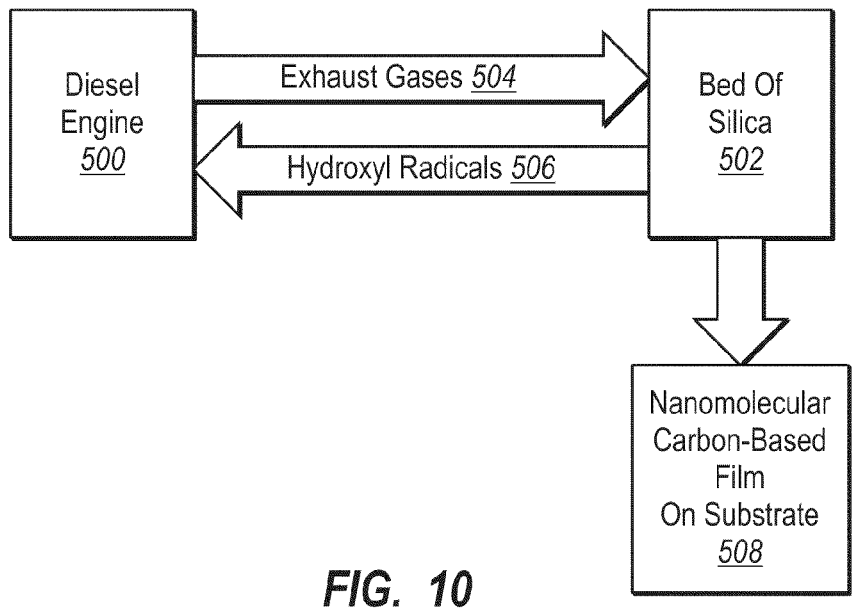
FIG. 10 is a box diagram that schematically illustrates a reaction chamber used in combination with a diesel engine for forming elongated, nano-scale carbon-based molecules that when aligned form a monomolecular carbon-based film.

FIG. 10 schematically illustrates a system that utilizes a diesel engine in combination with a reactor to produce the elongated carbon-based molecule that, when aligned, form the monomolecular film. FIG. 10 more particularly depicts the movement of exhaust gases and hydroxyl radicals between a diesel engine 500 and a bed 502 of catalytically reactive silica particles that produce hydroxyl radicals, which are hydrated at compression friction temperatures of 307° C. Supercritical water is formed as a gas plasma that produce muon methyl radicals to create complete combustion in the cylinders, which simultaneously refines 18 inorganic elements from injected fuel in compression. The modified exhaust stream which exits the exhaust manifold is channeled to the bed of silica 502 by means of an exhaust conduit. Interaction between the exhaust gases 504 and the bed of silica 502 yields a highly reactive atmosphere comprising highly reactive hydroxyl radicals 506. The returned hydroxyl radicals 506 are dehydrated at the catalyst temperature at 49° C. then return to a compression temperature of 307° C. This forms a constant cycle of highly energized hydroxyl radical 506. It is believed that the hydrated hydroxyl radicals 506 form supercritical water as a gas plasma at compression within the cylinders, which greatly increases the efficiency of the engine, eliminates soot and fuel blow-by, and reduces top combustion temperatures from at least 500° C. to over 900° C. to 375° C. The result is 99.995% oxygen, nitrogen and 80% reduction of $CO_2$ with reduced combustion temperatures compared to conventional diesel engines. In addition, a monomolecular carbon-based material 508 is produced and can be deposited onto a metallic or any none metallic substrate in fluid contact with gases contained within or emitted from the bed of silica 502.

Figure 11:
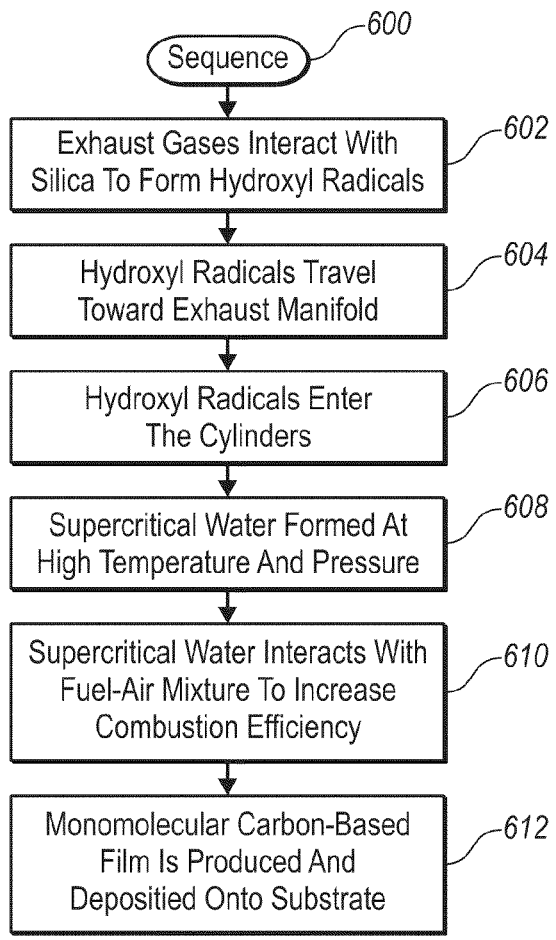
FIG. 11 is a flow chart showing the various steps involved in changing incomplete combustion to complete combustion efficiency of a diesel engine and concomitant formation and deposit of elongated, nano-scale carbon-based molecules that when aligned a substrate to form a monomolecular carbon-based film.

FIG. 11 is a flow diagram showing a sequence 600 including the various steps and reactions involved forming a monomolecular carbon-based film. In a first step 602, exhaust gases interact with silica and/or alumina to form hydroxyl radicals. In a second step 604, a stream of hydroxyl radicals travels toward the exhaust manifold of the diesel engine. In a third step 606, the hydroxyl radicals enter the cylinders. In a fourth step 608, the hydroxyls form supercritical water as a gas plasma with methyl muon radicals at high temperature and pressure. In a fifth step 610, the supercritical water interacts with the fuel-air mixture in order to greatly increase combustion efficiency, eliminate soot and fuel blow-by, and reduce combustion temperature. In a sixth step 612, a byproduct in the form of a monomolecular carbon-based film is produced and deposited on metallic substrates placed into contact with gases produced by the foregoing sequence.

The reactions of the invention also reduce the temperature of the exhaust. Whereas typical specifications are for temperatures averaging 706° F. at the muffler, exhaust temperatures emitted from the catalytic bed of silica were found to be as low as 49° C. (i.e., cool enough that moisture could be collected using a wax coated cup in one instance). The exhaust stream gases inside the reaction chamber were tested and found to be 49° C.

In general, it is currently believed that the "operating temperature" (i.e., the temperature at which the catalytic particles are able to produce a reactive atmosphere of highly reactive hydroxyl radicals, supercritical water and/or other reactive species (possibly muon radicals) and also form the monomolecular carbon-based film) may be as low as about 49° C. and as high as about 375° C. The catalytic systems used to form the monomolecular film according to the invention can be modified, such as by upscaling or downscaling, to catalytically treat virtually any waste exhaust stream which includes combustion products of carbon-containing fuels.

According to an alternative embodiment, a monomolecular carbon-based film can be deposited onto a metal sleeve using other methods, including chemical vapor deposition (CVD). Appropriate reagents (i.e., organic molecules, silane, ammonia, nitrogen, and a source of fluorine such as fluorocarbon, which in the initial instance was a contaminant) are heated to form a plasma, which is then deposited onto a metal substrate to form the monomolecular carbon-based film. However, while CVD forms a useful deposit or film on a metal substrate, it is generally not as readily scalable as the aforementioned method that utilizes waste exhaust gases from a diesel engine and a reactor comprising a bed of silica and/or alumina particles.

EXAMPLE 1

A monomolecular carbon-based film as described above was produced by passing emissions from a diesel engine through a reactor containing silica particles (e.g., as in FIG. 9) and deposited onto a 3/16 inch thick steel bar. The monomolecular carbon-based nanomaterial created a smoother surface that was lubricious to the touch. The elongated carbon-based molecules of the monomolecular film lie shoulder-to-shoulder to yield a structure that seats with a vacuum to the steel bar or any other substrate. Each molecule becomes a shock absorber and reduces friction. This deposit could not be scratched off (e.g., with a chisel) or burned. The film comprised of the monomolecular film sealed the bar and prevented oxidation. For example, a similarly coated steel bar was placed into ocean water for 30 days but showed no signs of oxidation, which was surprising since steel is readily oxidized in the presence of salt water from the Pacific Ocean.

The steel bar with the monomolecular carbon-based film was tested by passing a current through the interior of the steel bar (i.e., through the two ends, which had screws to introduce current at a voltage of 110 and 220 volts). A voltage was applied at one end of the steel bar, which caused a current to pass through the steel bar. The sides of the steel bar that included the monomolecular carbon-based film were found to be electrically insulated and did not permit passage therethrough of any current or electromagnetic radiation except through the end screw which was electrified. More surprisingly, placing magnets above and below the steel bar (i.e., the north pole adjacent to one side and the south pole adjacent to the opposite side) increased voltage across the steel bar, thereby boosting the power of the current passing through the steel bar. From this it may be predicted that placing magnets periodically along an electrical power line shielded using electrical cable shields according to the invention can further boost power over the power line and reduce or eliminate voltage losses. It may also be predicted that the use of the monomolecular carbon-based film on a metal substrate and in combination with magnets can act as a "battery" or a generator or alternative power source by producing a constant magnetic alternating current between both sides of the monomolecular carbon-based film.

Figure 12:
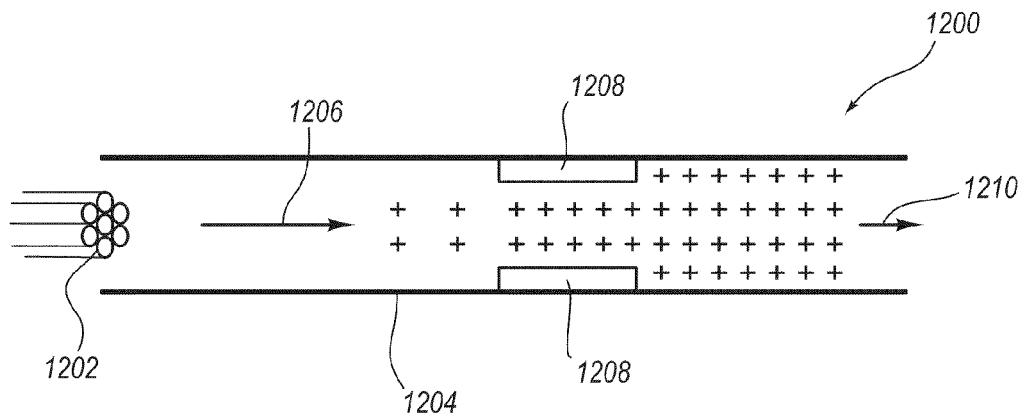
FIG. 12 is a schematic diagram that illustrates the increase in power density over a power transmission line that is surrounded by a shield with the monomolecular carbon-based film as the electric current passes by magnets positioned inside the shield near the outer surface of the power transmission line.

FIGS. 12-15 illustrate various embodiments of power boosting devices according to the invention. FIG. 12 schematically illustrates the power boosting effect of placing a shield treated with the monomolecular carbon-based film around a power transmission line and also placing magnets periodically along the shield. Power boosting apparatus 1200 includes a power transmission cable 1202 surrounded by a tubular or pipe-shaped shield 1204 that includes the monomolecular carbon-based film deposited in at least the interior surface of the shield 1204 (and optionally the outer surface to provide corrosion resistance). Positioned along shield 1204 are magnets 1208 which, in combination with the monomolecular carbon-based of the shield, increase power across the power line 1202. The initial current flow over the power line 1202 is illustrated by arrow 1206, and initial current density is illustrated by the spacing of the plus (+) symbols. As the current passes by magnets 1208, the electron flow is constricted and accelerated, thereby resulting in increased power flow illustrated by arrow 1210, and increased current density illustrated by the closer spacing of the plus (+) symbols.

Figure 13A:
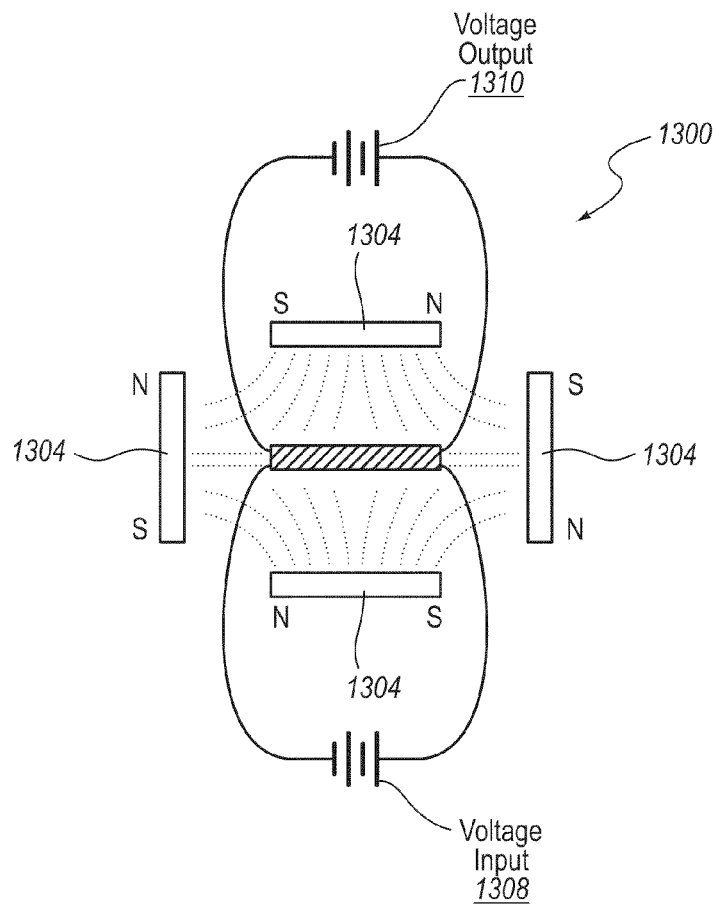
FIG. 13A schematically illustrates another inventive power boosting apparatus that includes a conductive metal substrate with the monomolecular carbon-based film on the surface of the conductive metal substrate, and the substrate is surrounded by a plurality of magnets that interact with electrons and the monomolecular carbon-based film to boost power over the conductive metal substrate.
Figure 13B:
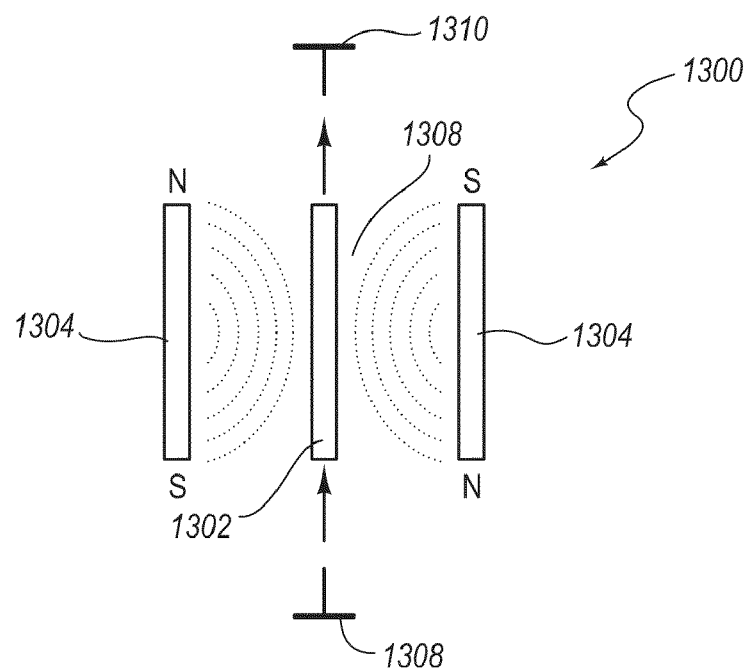
FIG. 13B is another view of the apparatus schematically illustrated in FIG. 13A.

FIG. 13A schematically illustrates a power boosting device 1300 (or "battery") that was made by placing a conductive metal bar 1302 treated with the monomolecular carbon-based film within a magnetic field produced by magnets 1304 placed around the conductive metal bar 1302. An initial input voltage 1308 introduced into the conductive metal bar 1302 results in an output voltage 1310 that is greater than the initial input voltage 1308. In some cases, an initial input voltage of 1.5 volts was increased to produce an output voltage of about 3 volts by the power boosting device 1300. In other cases, an initial input voltage of 3 volts was increased to produce an output voltage of about 9 volts. FIG. 13B is an alternative view of power boosting device 1300.

Figure 14:
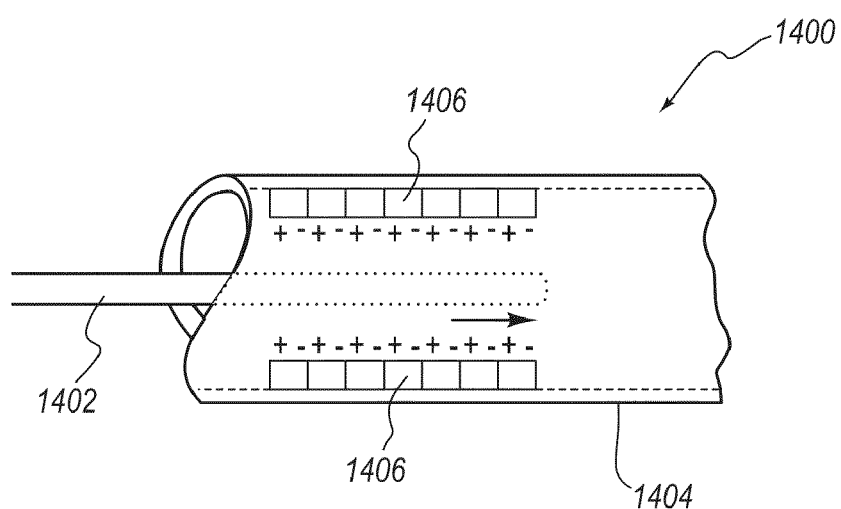
FIG. 14 schematically illustrates the arrangement of carbon molecules in which oppositely charged sides are aligned adjacent to each other on an inner surface of an electrical shield surrounding a power transmission line over which high voltage power is transmitted.

FIG. 14 schematically illustrates a power boosting device 1400 that includes a power transmission line 1402 encased within a shield 1404, which includes the monomolecular carbon-based film 1406 on an interior surface of the shield 1404. The film 1406 is illustrated as having an arrangement of carbon molecules in which oppositely charged sides are aligned adjacent to each other. This is what is believed to provide the indelible quality of the film, which prevents the film from being removed from the substrate 1404. Magnets (not shown) are placed along the shield 1404 to enhance or boost power over the power cable 1402.

Figure 15:
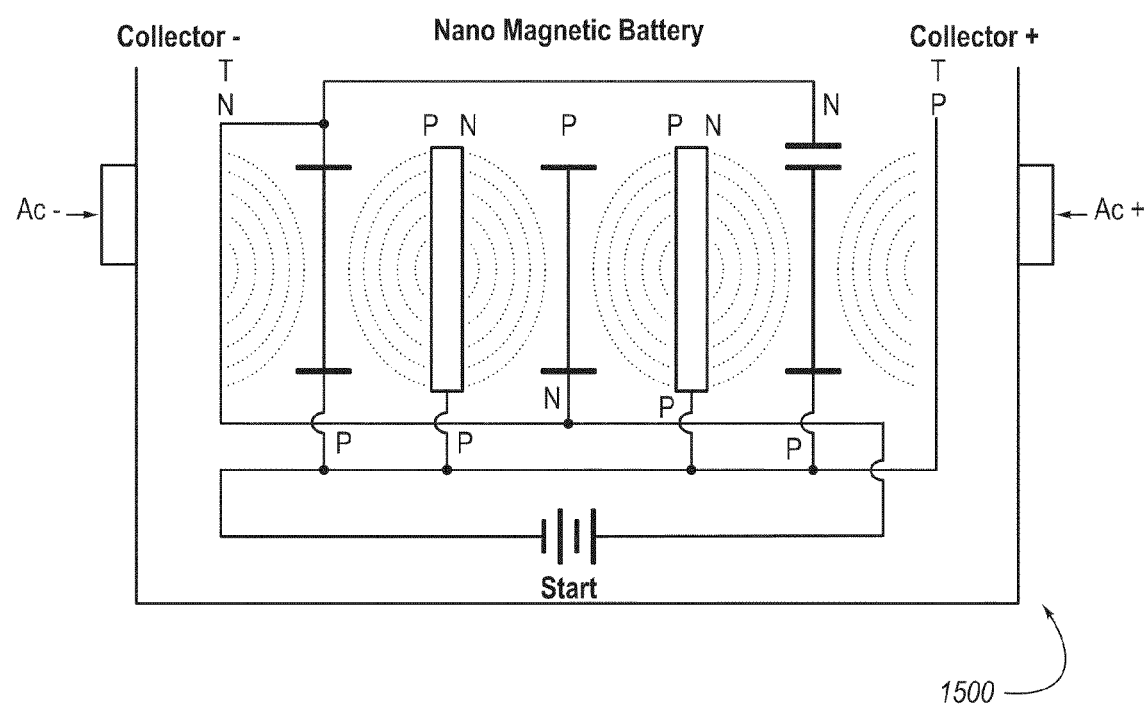
FIG. 15 schematically illustrates another arrangement of magnets relative to a plurality of conductive metal substrates enclosed within a shield comprising the monomolecular carbon-based film.

FIG. 15 schematically illustrates another power boosting device 1500 according to the invention, with a plurality of conductive substrates treated with the monomolecular carbon-based film positioned adjacent to a plurality of magnets that create a magnetic field so as to boost power through the conductive substrates.

EXAMPLE 2

A monomolecular carbon-based film produced by passing emissions from a diesel engine through a reactor containing silica particles (e.g., as in FIG. 9) was deposited onto a rusted ¼ inch thick steel bar that had a coating of rust on the surface. The monomolecular carbon-based nanomaterial created a smoother surface that was more lubricious to the touch. This deposit could not be scratched off (e.g., with a chisel) or burned. The film sealed the rusty bar and prevented rust from being rubbed off after four years, as was possible prior to treating the rusty bar with the monomolecular carbon-based film.

An apparatus for boosting electrical power can be manufactured by: (1) passing an exhaust stream produced while burning a carbon-based fuel through a reactor containing a bed of particles comprised of at least one of silica or alumina particles to yield a modified exhaust stream that exits the reactor; (2) contacting the modified exhaust stream with a metal substrate having a first surface and a second surface; (3) causing or allowing a monomolecular carbon-based film to form on the first and second surfaces of the metal substrate, the monomolecular carbon-based film comprising aligned elongated carbon-based molecules, the monomolecular carbon-based film providing a barrier that inhibits penetration of electrons through the first and second surfaces of the metal substrate; and (4) positioning the metal substrate within a magnetic field.

Alternatively, an apparatus for boosting electrical power can be manufactured by: (1) providing a metal substrate having a positive end, a negative end, a first surface, a second surface, an electrically conductive core extending from the positive end to the negative end, and a monomolecular carbon-based film on the first and second surfaces of the metal substrate; (2) positioning the metal substrate in a magnetic field provided by a plurality of magnets positioned adjacent and in a spaced-apart relationship to the metal substrate, wherein the magnets are oriented so as to match north and south poles of each magnet with opposite poles of an adjacent magnet; (3) positioning a positive electrode at the positive end of the metal substrate in electrical communication with the electrically conductive core; and (4) positioning a negative electrode at the negative end of the metal substrate in electrical communication with the electrically conductive core, the magnets, in combination with the monomolecular carbon-based film and the electrically conductive core, inducing or increasing a voltage between the positive electrode and the negative electrode and thereby boosting electrical power between the positive and negative electrodes.

A method of boosting electrical power comprises: (1) providing an apparatus for boosting electrical power comprised of (a) a metal substrate having a monomolecular carbon-based film on first and second surfaces, a conductive core, a positive electrode at one end, and a negative electrode an opposite end and (b) a plurality of magnets positioned adjacent and in a spaced-apart relationship to the metal substrate, wherein the magnets are oriented so as to match north and south poles of each magnet with opposite poles of an adjacent magnet; (2) passing an initial electric current having an initial voltage through the conductive core of the metal substrate; and (3) causing or allowing an interaction between the metal substrate, the monomolecular carbon-based film, and the magnets to produce a modified electric current having a final voltage that is greater than the initial voltage.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for boosting electrical power, comprising:
  a metal substrate having a positive end, a negative end, a first surface, a second surface, and an electrically conductive core extending from the positive end to the negative end of the metal substrate;
  a first magnet having a north pole and a south pole positioned adjacent and in a spaced-apart relationship to the first surface of the metal substrate, wherein the north and south poles of the first magnet are oriented in a first relationship relative to the metal substrate;
  a second magnet having a north pole and a south pole positioned adjacent and in a spaced-apart relationship to the second surface of the metal substrate, wherein the north and south poles of the second magnet are oriented in a second relationship relative to the metal substrate that is opposite to the first relationship of the first magnet;
  a positive electrode at the positive end of the metal substrate in electrical communication with the electrically conductive core;
  a negative electrode at the negative end of the metal substrate in electrical communication with the electrically conductive core; and
  a monomolecular carbon-based film having aligned elongated carbon-based molecules on the first and second surfaces of the metal substrate, the monomolecular carbon-based film providing a barrier that inhibits penetration of electrons from the electrically conductive core through the first and second surfaces, the first and second magnets, in combination with the monomolecular carbon-based film and the electrically conductive core, inducing or increasing a voltage between the positive electrode and the negative electrode and thereby boosting electrical power between the positive and negative electrodes.

2. An apparatus as in claim 1, wherein the metal substrate comprises at least one metal selected from the group consisting of iron, steel, aluminum, and copper.

3. An apparatus as in claim 1, the monomolecular film further providing corrosion resistance to the metal substrate.

4. An apparatus as in claim 1, further comprising one or more additional magnets positioned adjacent to and spaced apart from the metal substrate.

5. An apparatus as in claim 4, wherein the apparatus includes six magnets positioned adjacent to and spaced apart from and around the metal substrate.

6. A method manufacturing an apparatus for boosting electrical power, comprising:
 passing an exhaust stream produced while burning a carbon-based fuel through a reactor containing a bed of particles comprised of at least one of silica or alumina particles to yield a modified exhaust stream that exits the reactor;
 contacting the modified exhaust stream with a metal substrate having a first surface and a second surface;
 causing or allowing a monomolecular carbon-based film to form on the first and second surfaces of the metal substrate, the monomolecular carbon-based film comprising aligned elongated carbon-based molecules, the monomolecular carbon-based film providing a barrier that inhibits penetration of electrons through the first and second surfaces of the metal substrate; and
 positioning the metal substrate within a magnetic field.

7. A method as in claim 6, wherein positioning the metal substrate within a magnetic field comprises positioning a plurality of magnets adjacent to and in a spaced apart relationship to the metal substrate.

8. A method as in claim 7, wherein the magnets are oriented so as to match north and south poles of each magnet with opposite poles of an adjacent magnet.

9. A method as in claim 7, wherein six magnets are placed around the metal substrate.

10. A method as in claim 6, wherein the metal substrate comprises at least one metal selected from the group consisting of iron, steel, aluminum, and copper.

11. A method as in claim 6, wherein the exhaust stream is produced by a diesel engine, the reactor producing hydroxyl radicals within 30 seconds of diesel ignition, and thereafter the diesel engine having essentially complete combustion in which is 99.995% of the exhaust gases produced thereby include oxygen, nitrogen and 80% depleted $CO_2$, with a drop in temperature, and a two thirds reduction in fuel consumption.

12. A method as in claim 6, wherein the diesel engine and reactor produce dehydrated hydroxyl radicals that form supercritical water as a gas plasma within cylinders of the diesel engine at piston compression and muon methyl radicals as a product of the supercritical gas plasma to yield the modified exhaust stream.

13. A method as in claim 12, wherein the magnets generate increased voltage across the metal substrate by creating a continuous corona circle and bombarding the shield with electrons from divided U-shaped magnets.

14. A method manufacturing an apparatus for boosting electrical power, comprising:
 providing a metal substrate having a positive end, a negative end, a first surface, a second surface, an electrically conductive core extending from the positive end to the negative end, and a monomolecular carbon-based film on the first and second surfaces of the metal substrate;
 positioning the metal substrate in a magnetic field provided by a plurality of magnets positioned adjacent and in a spaced-apart relationship to the metal substrate, wherein the magnets are oriented so as to match north and south poles of each magnet with opposite poles of an adjacent magnet;
 positioning a positive electrode at the positive end of the metal substrate in electrical communication with the electrically conductive core; and
 positioning a negative electrode at the negative end of the metal substrate in electrical communication with the electrically conductive core;
 the magnets, in combination with the monomolecular carbon-based film and the electrically conductive core, inducing or increasing a voltage between the positive electrode and the negative electrode and thereby boosting electrical power between the positive and negative electrodes.

15. A method as in claim 14, wherein six magnets are placed around the metal substrate.

16. A method as in claim 14, wherein the metal substrate comprises at least one metal selected from the group consisting of iron, steel, aluminum, and copper.

17. A method of boosting electrical power, comprising:
 providing an apparatus for boosting electrical power comprised of:
  a metal substrate having a monomolecular carbon-based film on first and second surfaces, a conductive core, a positive electrode at one end, and a negative electrode an opposite end; and
  a plurality of magnets positioned adjacent and in a spaced-apart relationship to the metal substrate, wherein the magnets are oriented so as to match north and south poles of each magnet with opposite poles of an adjacent magnet;
 passing an initial electric current having an initial voltage through the conductive core of the metal substrate; and
 causing or allowing an interaction between the metal substrate, the monomolecular carbon-based film, and the magnets to produce a modified electric current having a final voltage that is greater than the initial voltage.

18. A method as in claim 17, wherein the power boosting apparatus includes six magnets positioned adjacent to and spaced apart from and around the metal substrate.

19. A method as in claim 17, wherein the metal substrate comprises at least one metal selected from the group consisting of iron, steel, aluminum, and copper.

20. A method as in claim 17, wherein the magnets generate increased voltage across the metal substrate by creating a continuous corona circle and bombarding the shield with electrons from divided U-shaped magnets.

* * * * *

UNITED STATES PATENT AND TRADEMARK OFFICE
CERTIFICATE OF CORRECTION

PATENT NO. : 7,985,922 B2  
APPLICATION NO. : 12/778836  
DATED : July 26, 2011  
INVENTOR(S) : Thomas C. Maganas Page 1 of 3

It is certified that error appears in the above-identified patent and that said Letters Patent is hereby corrected as shown below:

Drawings
Sheet 9, replace Figure 10 with the figure depicted below, wherein "Nanomolecular" has been changed to -- Monomolecular--

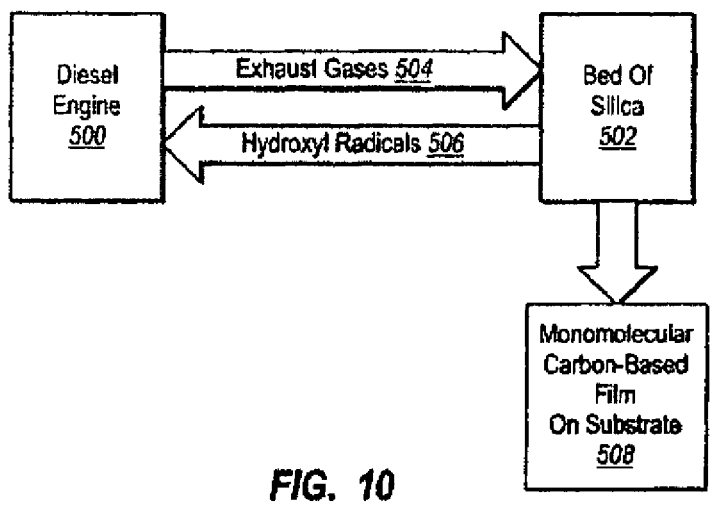

FIG. 10

Signed and Sealed this
Seventh Day of February, 2012

David J. Kappos
*Director of the United States Patent and Trademark Office*

CERTIFICATE OF CORRECTION (continued)
U.S. Pat. No. 7,985,922 B2

Sheet 10, replace Figure 13A with the figure depicted below, wherein the reference number --1302-- has been inserted.

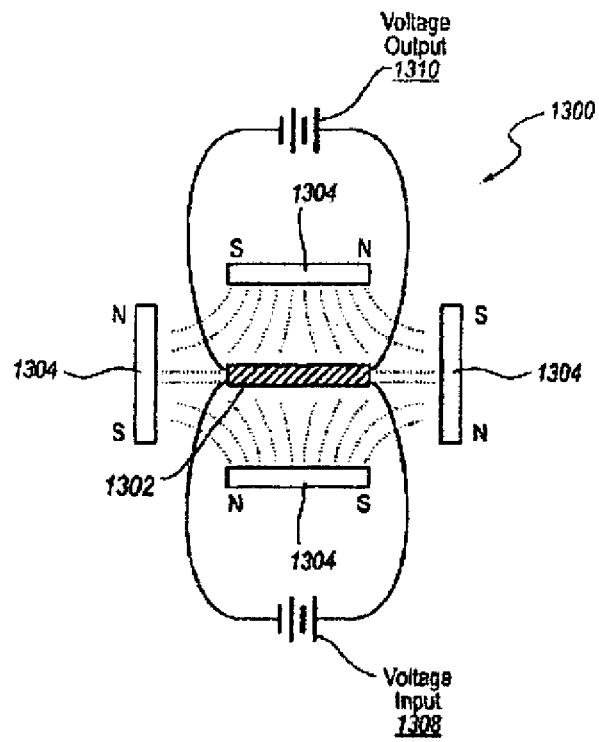

FIG. 13A

Column 1
Line 34, change "Director National" to --Director of National--
Line 44, change "currant" to --current--
Line 47, change "use rubber" to --use of rubber--

Column 3
Line 17, change "when aligned a" to --are aligned on a--
Line 53, change "positing the an" to --depositing the--

Column 4
Line 41, change "Mainz Germany" to --Mainz, Germany--
Line 42, change "which are generally" to --which generally--

Column 5
Line 37, change "currant" to --current--
Line 48, change "ellipsometor" to --ellipsometer--
Line 67, change "which is debris of" to --which debris is of--

CERTIFICATE OF CORRECTION (continued)
U.S. Pat. No. 7,985,922 B2

Column 6
Line 8, change "lead" to --led--
Line 45, change "twenty three" to --twenty-three--

Column 8
Line 21, change "base" to --based--

Column 9
Line 11, change "radical" to --radicals--
Line 21, change "none" to --non--

Column 10
Line 60, change "carbon-based of" to --carbon-based film of--

Column 13
Line 18, change "method manufacturing" to --method of manufacturing--
Line 51, after "which" remove [is]

Column 14
Line 3, change "method manufacturing" to --method of manufacturing--
Line 38, after "electrode" insert --at--